Oct. 27, 1931.  J. W. VANCE  1,829,202
MACHINE FOR MAKING RADIATING TUBES
Filed Nov. 8, 1926  10 Sheets-Sheet 2
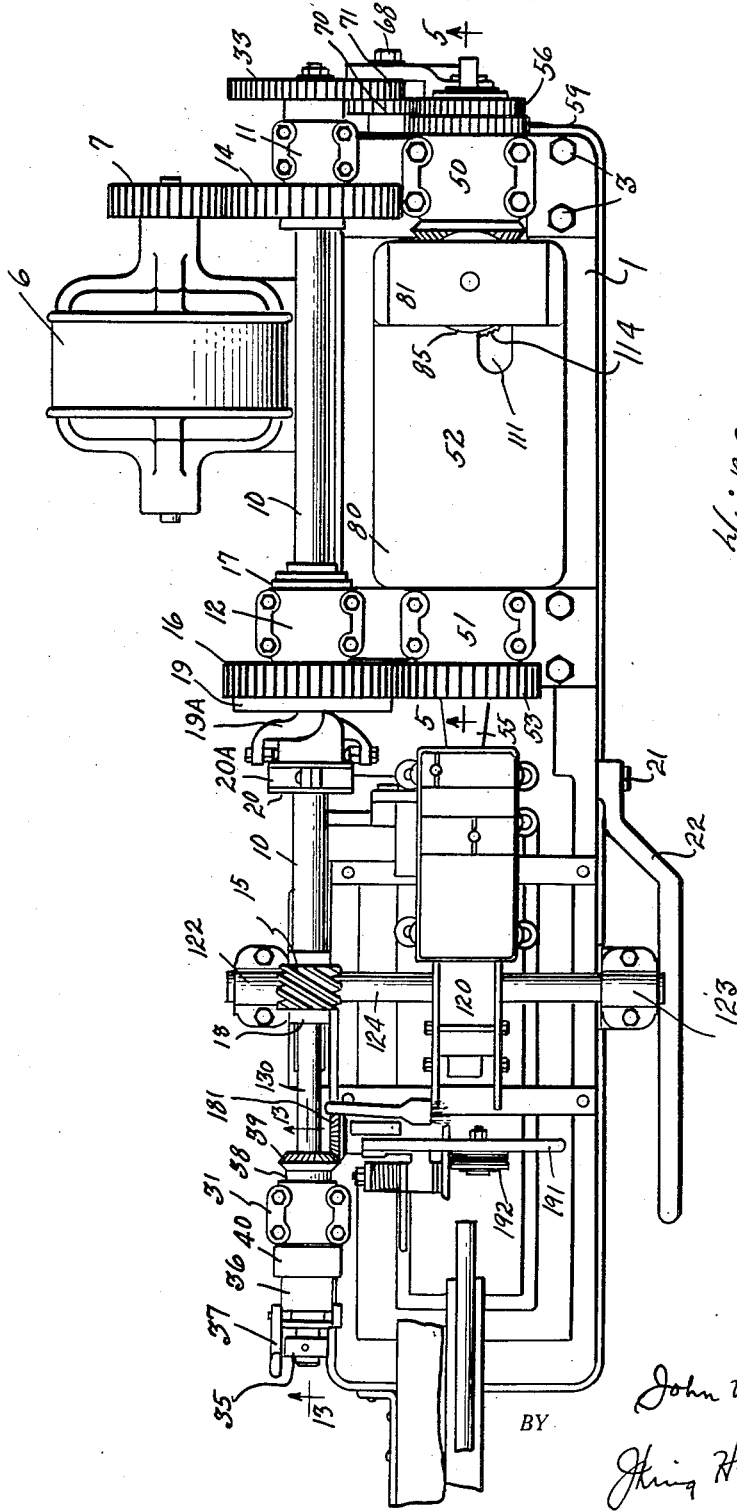
INVENTOR.
John W. Vance
BY
ATTORNEY.

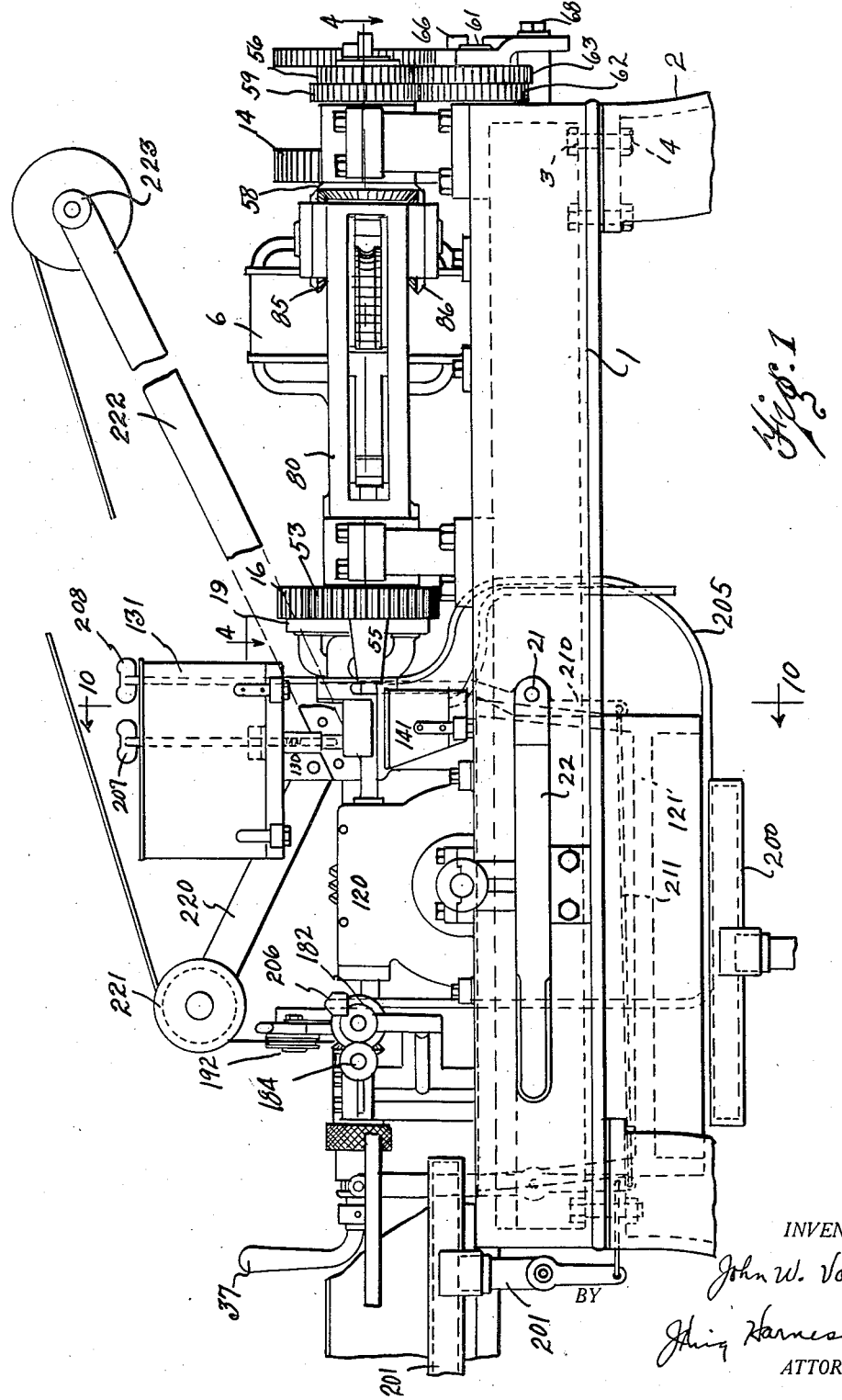

Oct. 27, 1931.   J. W. VANCE   1,829,202
MACHINE FOR MAKING RADIATING TUBES
Filed Nov. 8, 1926   10 Sheets-Sheet 3
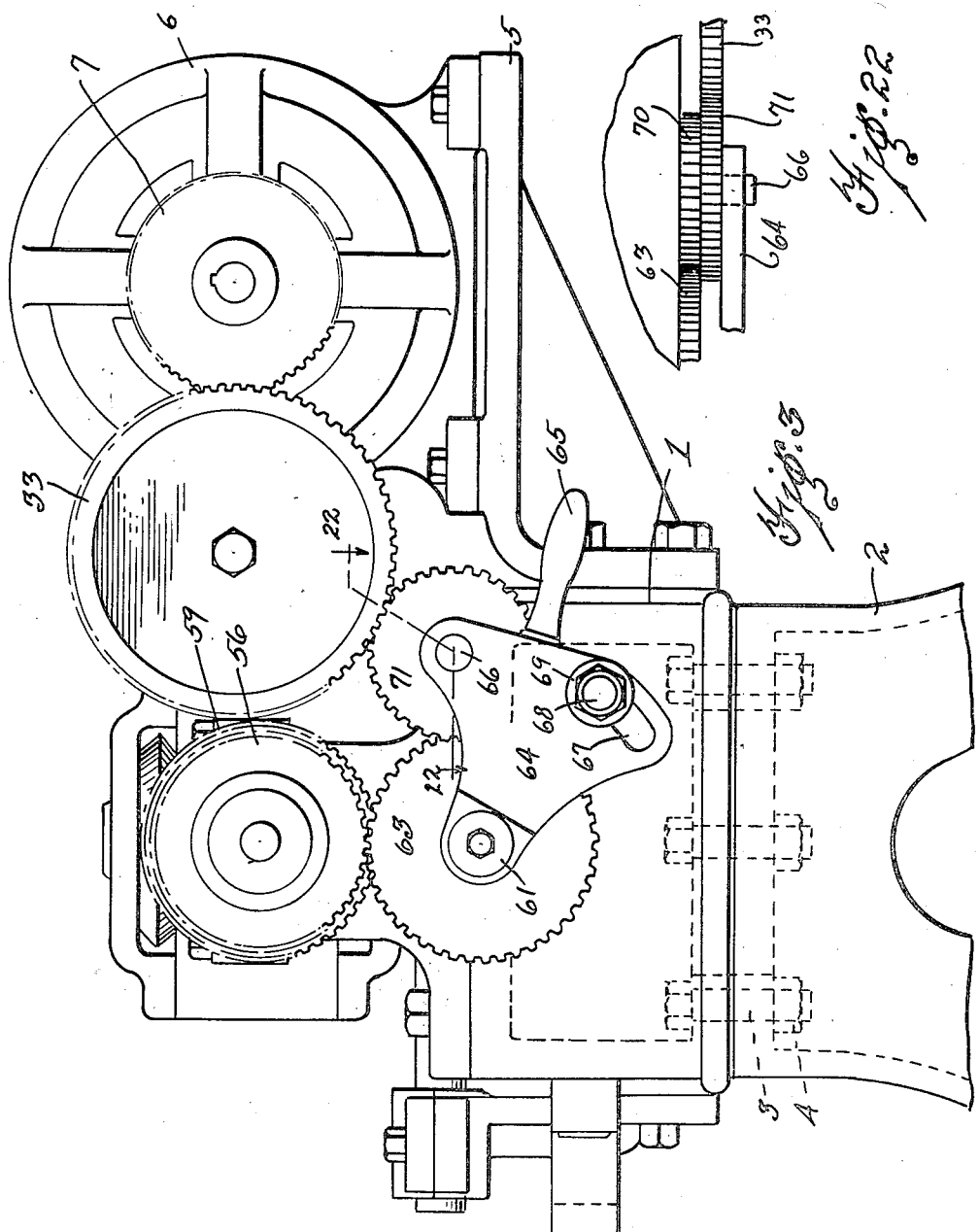
INVENTOR.
John W. Vance
BY
Irving Harness
ATTORNEY.

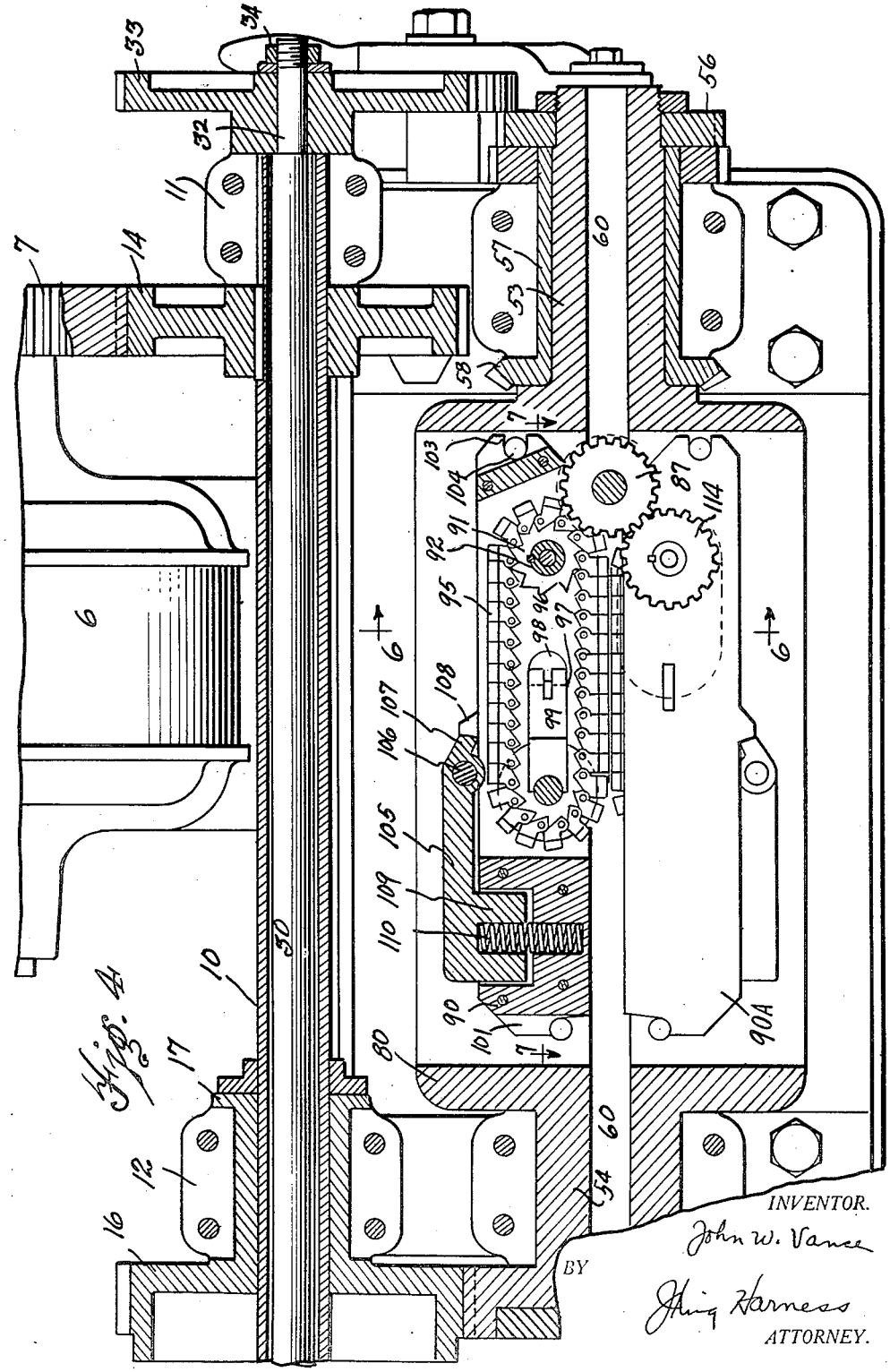

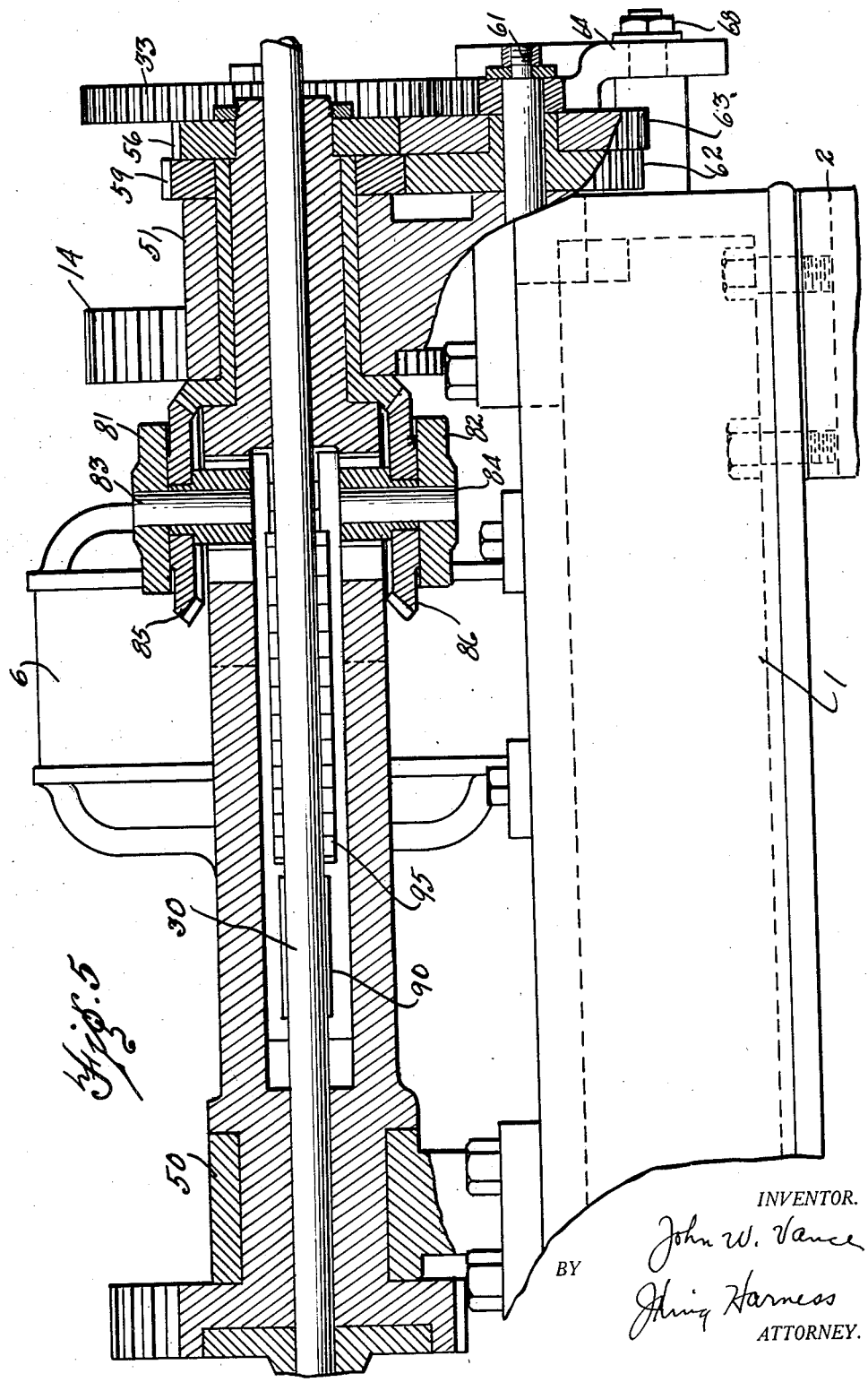

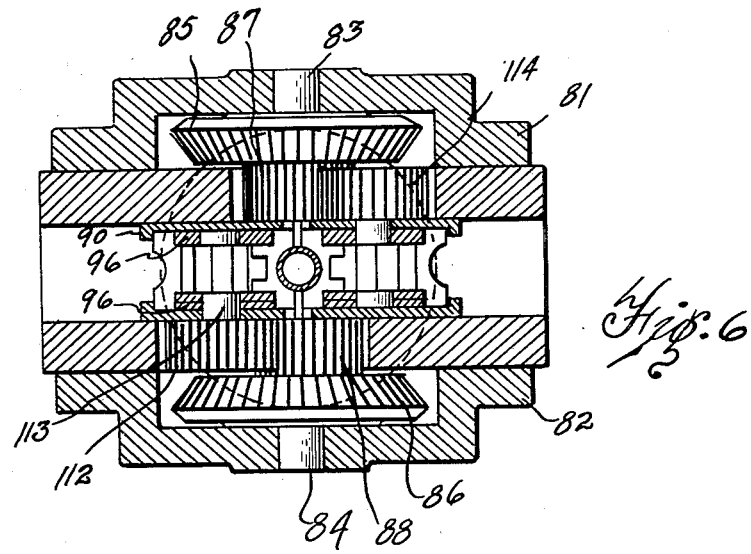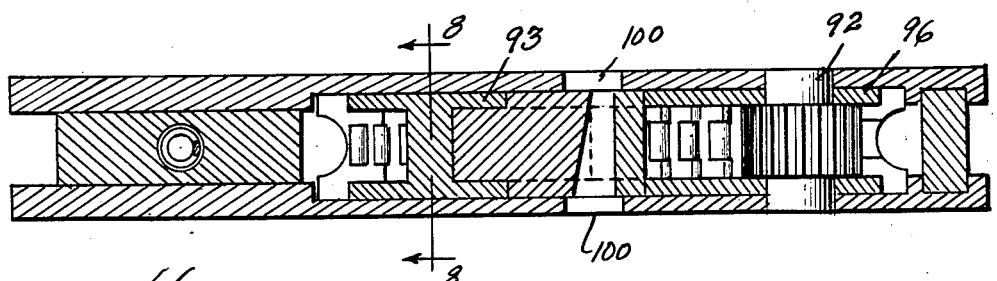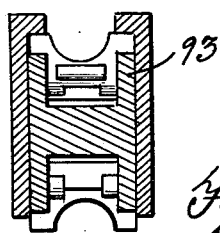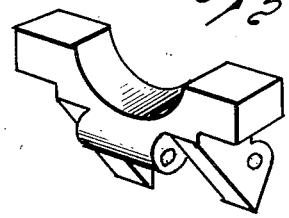

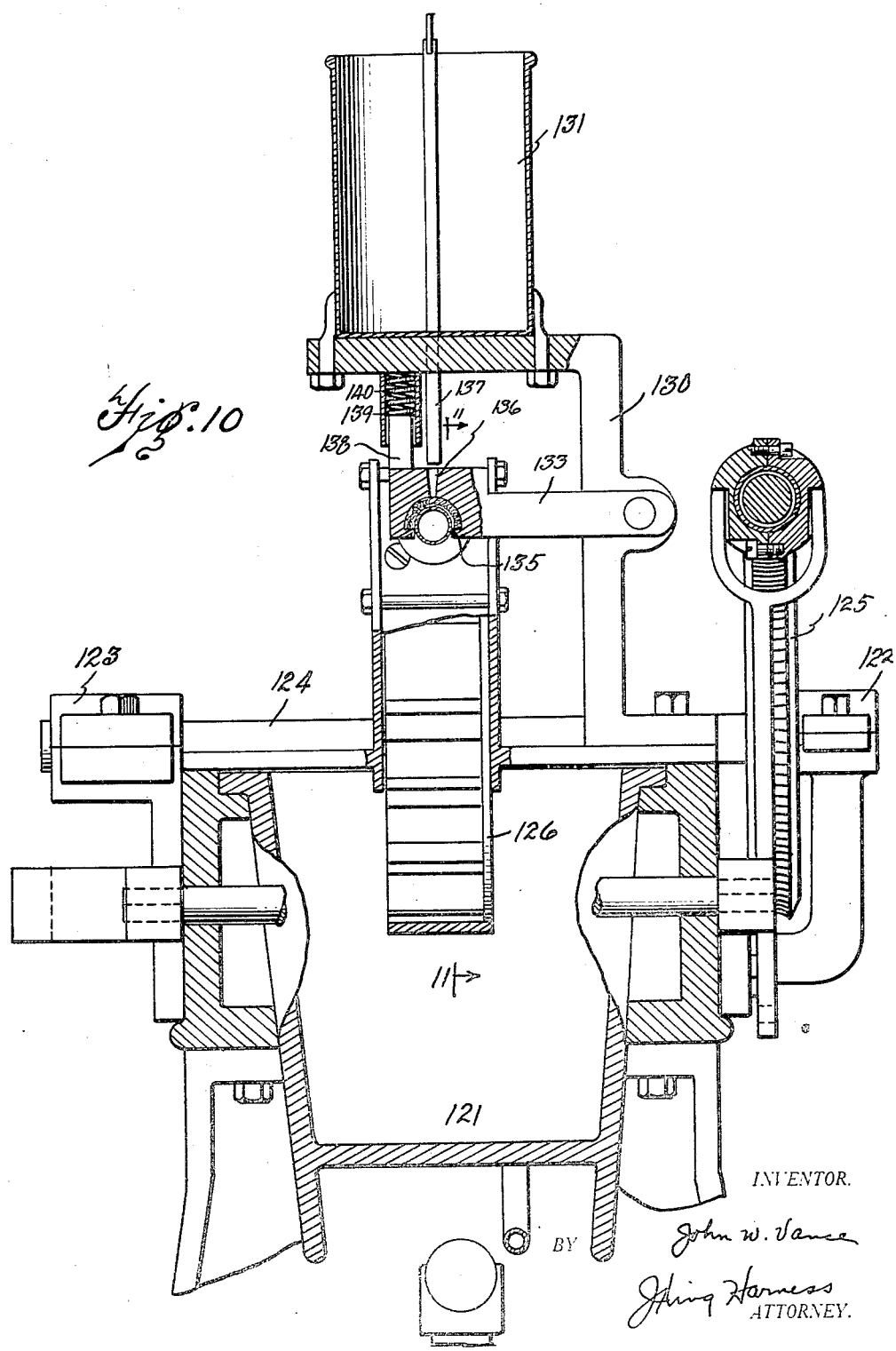

Oct. 27, 1931.  J. W. VANCE  1,829,202
MACHINE FOR MAKING RADIATING TUBES
Filed Nov. 8, 1926    10 Sheets-Sheet 8
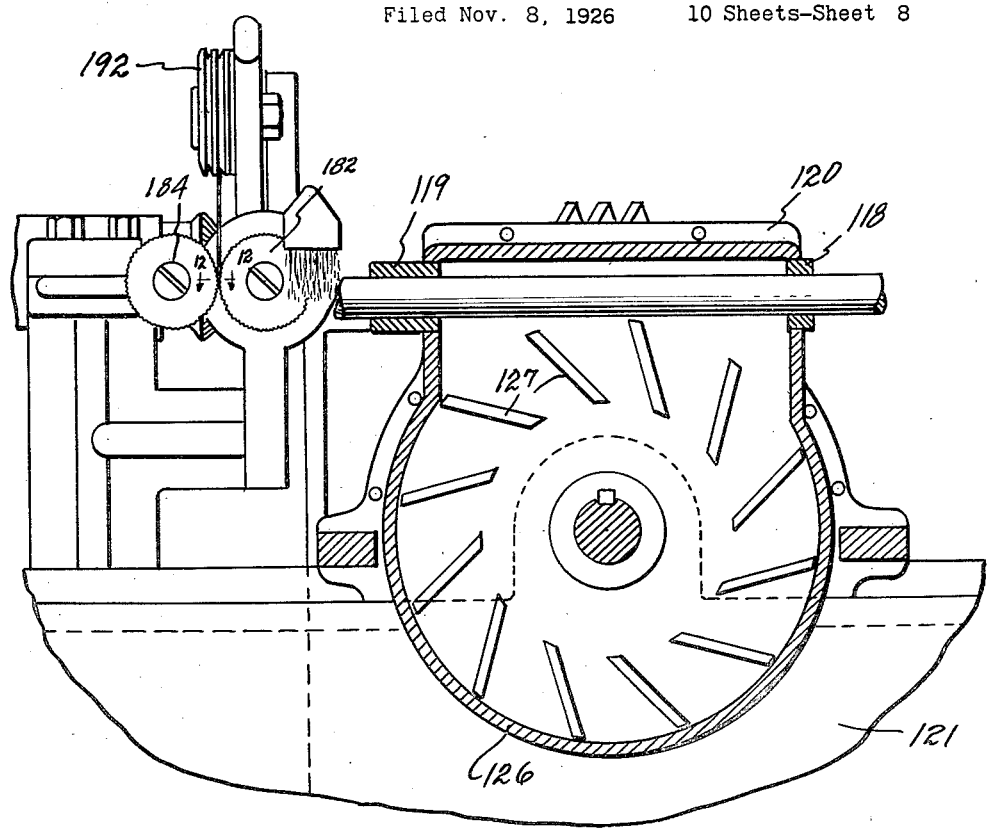
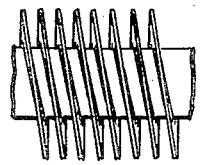
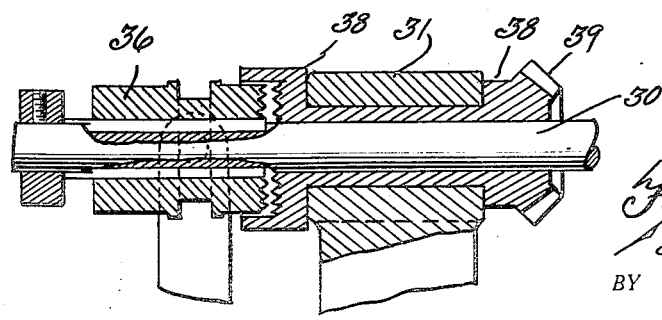
INVENTOR.
John W. Vance
BY
King Harness
ATTORNEY.

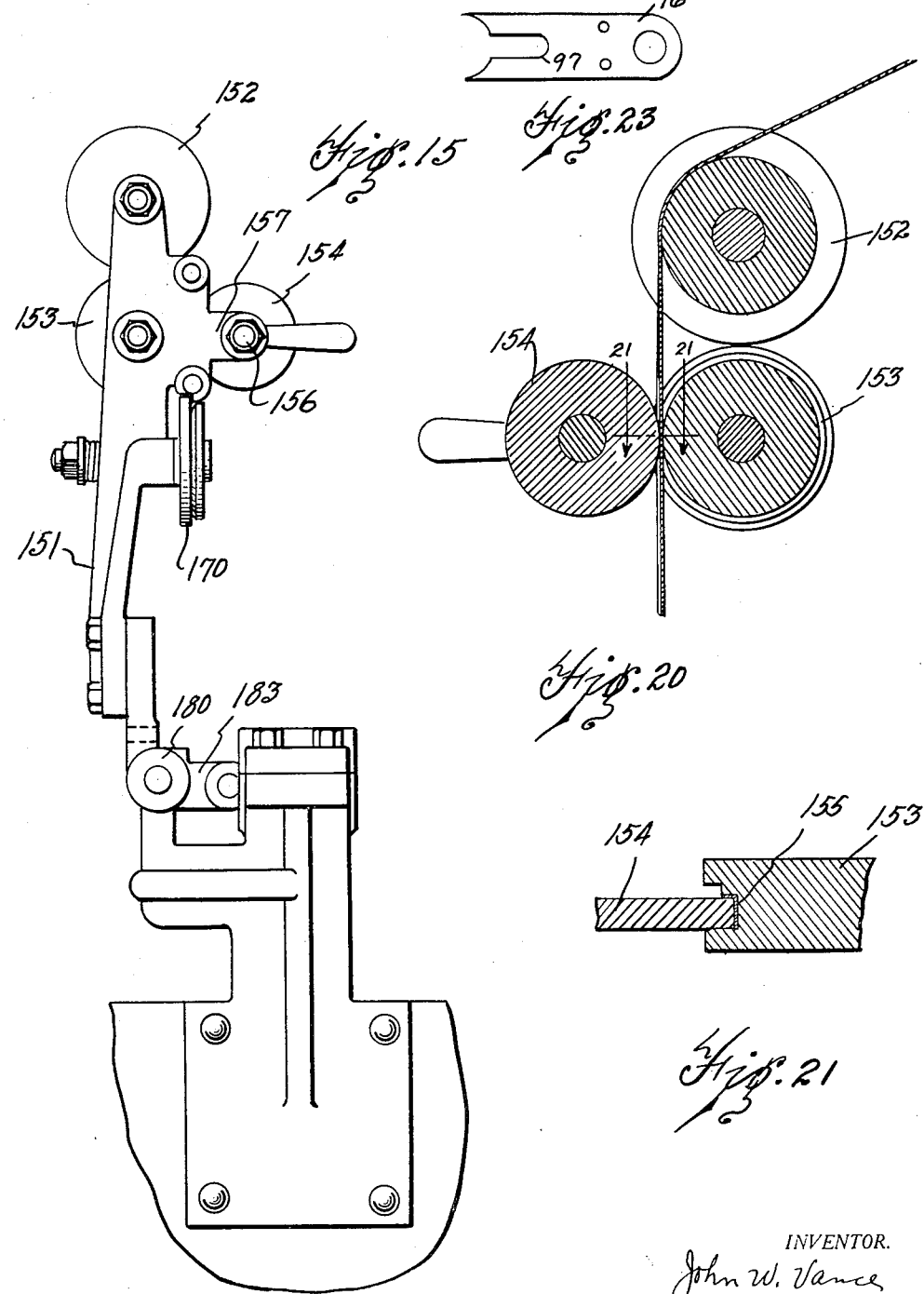

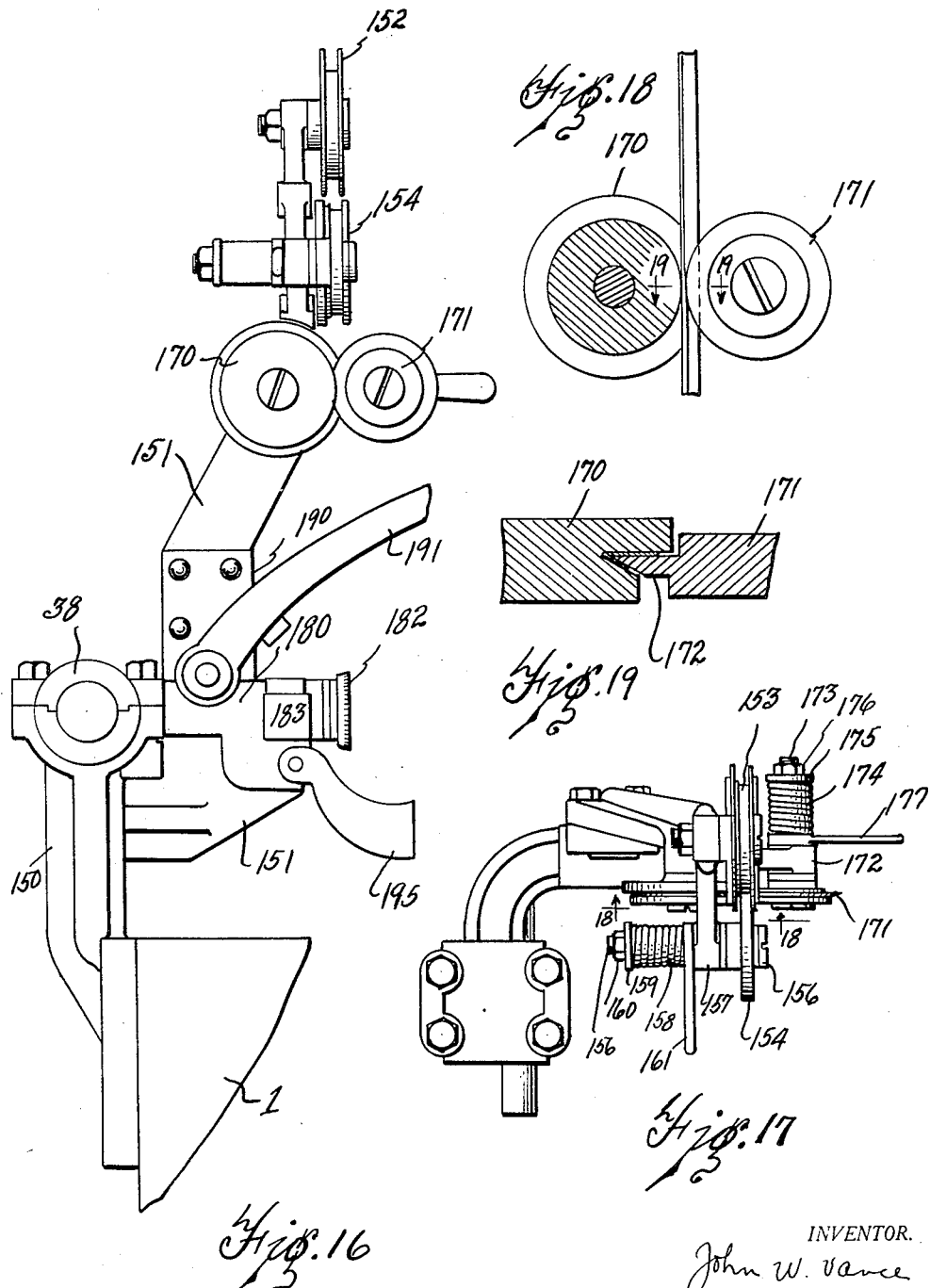

Patented Oct. 27, 1931

1,829,202

UNITED STATES PATENT OFFICE

JOHN W. VANCE, OF DETROIT, MICHIGAN

MACHINE FOR MAKING RADIATING TUBES

Application filed November 8, 1926. Serial No. 146,932.

The object of my invention is to provide a machine which will continuously wind and secure a metal ribbon or fin edgewise upon a tube of indefinite length.

Another object of my invention is to provide a machine which will operate equally well upon either hard or soft tubing.

Another object of my invention is to provide a machine which will continuously perform the operation above described and which will require the attention of only a single operator.

With these and other objects in view, my invention consists in the arrangement, combination and construction of the various parts of my improved device, as described in the specification, claimed in my claims and shown in the accompanying drawings, in which:

Fig. 1 is a side elevation of my machine.
Fig. 2 is a plan view of my machine.
Fig. 3 is a front elevation of my machine.
Fig. 4 is a section taken on line 4—4 of Fig. 1.
Fig. 5 is a section taken on line 5—5 of Fig. 2.
Fig. 6 is a section taken on line 6—6 of Fig. 4.
Fig. 7 is a section taken on line 7—7 of Fig. 4.
Fig. 8 is a section taken on line 8—8 of Fig. 7.
Fig. 9 is a detail of a link of the drive chains shown in Figs. 4, 6, 7 and 8.
Fig. 10 is a section taken on line 10—10 of Fig. 1.
Fig. 11 is a section taken on line 11—11 of Fig. 10.
Fig. 12 is a section taken on line 12—12 of Fig. 11.
Fig. 13 is a section taken on line 13—13 of Fig. 2.
Fig. 14 is a detail of the tube showing the metal ribbon or strip as secured thereon by my machine.
Fig. 15 is an elevation of the ribbon or fin reinforcing rolls embodied in my machine, taken from the rear side of the machine.
Fig. 16 is an elevation from the rear end of my machine showing the ribbon or fin reinforcing and guide rolls used thereon.
Fig. 17 is a plan view of the device shown in Figs. 15 and 16.
Fig. 18 is a section taken on line 18—18 of Fig. 17.
Fig. 19 is a section taken on line 19—19 of Fig. 18.
Fig. 20 is a front sectional elevation of the first pair of ribbon or fin reinforcing rolls shown in Figs. 15 and 16.
Fig. 21 is a section taken on line 21—21 of Fig. 20.
Fig. 22 is a section taken on line 22—22 of Fig. 3.
Fig. 23 is a detail of the chain slide plate in the chain assembly unit.

It is well known in the industry that machines now in use for making radiating tubes are inefficient and unsatisfactory in their inability to wind radiating fins upon soft as well as hard tubing at a speed that will meet production demands, in the amount of solder which they use, and waste in securing the radiating fin to the tube,—in the length of time necessary to make repairs when the principal working parts get out of order,—in the amount of labor necessary for attendance upon the machine during its operation. These items materially increase the cost of manufacture of radiator tubing, and my device is particularly designed to eliminate them.

My machine is provided with a plurality of operating stations arranged in the order of their operation upon the tubing. The direction of movement of the tubing through the machine is from right to left with reference to the drawings in Figs. 1 and 2. The tubing is first engaged by a rotating and driving mechanism, it then passes to a station at which flux is applied, then through a soldering pot where it is covered with solder, then to devices which prepare and apply the fin thereto, and then past a reheating station which serves to embed the edge of the fin firmly in the solder with which the tube is covered, and finally to any suitable support where it may be cut into any desired lengths.

My machine is mounted upon a base 1 which may be supported by legs 2 at each end and intermediate the ends if desired, which are secured to the base 1 by suitable bolts and nuts 3 and 4. Secured to one side of the base 2 is a bracket 5 which supports a motor 6 to the shaft of which is secured a pinion 7.

Longitudinally disposed along one side and mounted upon the base 2 is a hollow shaft 10 which is supported at one end by the bearing 11, intermediately by the bearing 12, and at its other end by the bearing 13. Secured to the shaft 10 adjacent the bearing 11 and in position to mesh with the pinion 7 is a pinion 14, and secured to its other end adjacent the bearing 13 is a worm gear 15.

A pinion 16 having a sleeve 17, as shown more clearly in Fig. 4 is rotatably mounted on the shaft 10 adjacent the bearing 12, with its sleeve 17 secured in the bearing 12 and rotatable therein independently of the shaft 10. The rear face of the pinion 16 is formed to receive a friction clutch (Fig. 2), the cone 19 of which is suitably secured to the arms 19A on the sleeve 20 which is slidably but rotatably secured to the shaft 10 and is operated through the band 20A by the shaft 21 and lever 22.

Within the hollow shaft 10 is positioned a solid shaft 30, as shown in Fig. 4, which extends from the bearing 11 through the bearing 12, the bearing 13 and the bearing 31. Solid shaft 30 is provided with a reduced extension 32 which extends forwardly of the bearing 11 and supports a pinion 33 which is keyed thereto, and secured by the nut 34 threaded on the end of extension 32. Secured to the other end of shaft 30 is a collar 35, as shown in Fig. 2.

A ratchet clutch mechanism 36 is secured on shaft 30 adjacent collar 35, as shown in Fig. 13, and is operated by handle 37, as shown in Figs. 1 and 2. Extending through bearing 31 and engageable with the rotating clutch mechanism 36 is a sleeve 38 which is rotatable independently of the shaft 30 and which carries at its opposite end a miter gear 39, which operates the ribbon or fin corrugating mechanism hereinafter described. The end of sleeve 38 which engages the clutch 36 is provided with a sleeve 40 which is roughened on its outer surface to provide a hand grip so that sleeve 38 and miter gear 39 may be turned by hand when desired.

Positioned upon base 2 at the forward end thereof is a bearing 50 and positioned adjacent the bearing 12 is bearing 51. A tube revolving and driving mechanism 52 having a sleeve 53 journaled in bearing 50, and a sleeve 54 journaled in bearing 51 is positioned for revolution between the bearings 51 and 52. The sleeve 54 of the member 52 is provided with a pinion 53 which is positioned to engage pinion 16, and which has a centrally extending nozzle 55 extended toward the rear of the machine. The sleeve 53 journaled in bearing 50 has secured to its end a pinion 56. There is also journaled in bearing 50, and around sleeve 53, a sleeve 57 which carries on its inner end adjacent the member 52 a bevel gear 58 and which has secured to its outer end a pinion gear 59. The sleeve 57 revolves in the bearing 50 independently of the sleeve 53. A stub shaft 61 is secured in the base beneath the bearing 50 and carries a pinion 62, as shown in Figs. 1, 3 and 5, which meshes with pinion 59 on sleeve 57, and also carries a pinion 63 which meshes with pinion 56 on sleeve 53.

Secured to the outer end of a stub shaft 61 is a triangular sweep 64 having a handle 65. In the upper base corner of the sweep 64 is secured a stub shaft 66, and in the lower base corner thereof is an elongated slot 67. A stud bolt 68 having a removable nut 69, as shown in Fig. 3, is secured to the base 1 and extends through the slot 67 in order that the sweep 64 may be adjustably secured at any point within the range of the slot 67. Secured to the stub shaft 66 on the inner side of the sweep 64 is a pinion 70 which meshes with pinion 63, as shown in Fig. 22. Also secured to the stub shaft 66 and rotatable with the pinion 70 is a second pinion 71 which meshes with pinion 33, as shown in Figs. 2, 3 and 22.

The revolving and driving member 52 comprises a rectangular box-like housing 80 which is open at the sides as shown in Figs. 5 and 6. Positioned transversely on the forward end of the housing 80 on each side thereof, as shown in Figs. 1, 2, 5 and 6 are gear retainers 81 and 82. Journaled in the gear retainers 81 and 82 are gear trunnions 83 and 84 which respectively carry bevel gears 85 and 86 and pinion gears 87 and 88, as shown in Fig. 6.

Within the housing 80 and adjacent the axial passage 60 are positioned chain housings 90 and 90A, as shown in Figs. 4 and 6, which are of like construction. Within the chain housing 90 and adjacent the forward end thereof is secured a sprocket 91 carried by a sleeve shaft 92, as more clearly shown in Fig. 7, which is journaled in the sides of the housing 90. Positioned within the housing 90 and between the sides thereof is an idler roll 93, as shown more clearly in Figs. 7 and 8. Positioned upon the sprocket 91 and the idler roll 93 for rotation in the housing 90, as shown in Fig. 4, is a chain 95. Within the chain housing 90 and on either side of the sprocket 91 is a plate 96, as shown in Fig. 23, and which are secured to the sides of chain housing 90. One end of each of the plates 96 is apertured to fit freely around the sleeve 92 on either side of the sprocket 91. The other ends of the plates have substantially semi-circular bearings cut therein in which the edges of idler roll 93 ride, and serve to secure the idler roll 93 within the housing 90. A longitudinal slot 97 is cut back from the semi-circular bearings in the end of plates 96, and a tongued block 98 is fitted in the terminal ends of the slot 97, as shown in Fig. 4. An idler block 99 having one end notched to fit the tongued block 98, and having a semi-circular bearing formed in the other end thereof to fit upon the axis of the idler roll 93, is positioned between the plates 96, as shown in Fig. 4, and slots 100 are provided in the sides of chain housing 90 leading to the contact between the idler block 99 and tongued block 98, so that a wedge may be inserted to move the idler block 99 and the idler roll 93 to tighten the chain 95. The chain housing 90 has formed at one end a shoulder lug 101 which is adapted to hook over a pin 102 secured in the walls of the housing 80. The opposite end of chain housing 90 is provided with a slot 103 adapted to fit over pin 104 which is secured in the walls of the housing 80, as shown in Fig. 4. A locking member 105 is pivoted on a pin 106 which is secured in the walls of housing 80, as shown in Fig. 4. One end of the locking member 105 is provided with a lug 107 which engages the lug 108 formed on the chain housing 90. The opposite end of the member 105 is provided with an extended portion 109 which is recessed to receive a coil spring 110, and the end of chain housing 90 is recessed to receive the extension 109 of the member 105 and also to receive and hold the coil spring 110, as clearly shown in Fig. 4. The spring 110 is tensioned to force the end 109 of the member 105 upwardly and cause the end 107 to bear down against the housing 90 and thereby hold the same firmly in position. Chain housing 90 is secured within the housing 80 by engaging the slot 103 with pin 104, and the shoulder 101 with the pin 102. The locking member 105 is then placed in position, as shown, and pin 106 is inserted to secure it.

The housing 80 has on its under side an elongated aperture similar to the aperture 111 shown in Fig. 2, which permits the removable pinion 112, shown in Fig. 6, to be secured to the sprocket 91 by the insertion of its splined shaft 113 in the sleeve 92 of the pinion 91. The elongated form of the aperture on the under side of the housing 80 which is similar to the aperture 111, makes it possible to insert pinion 112 when the housing 90 is partly inserted in the housing 80, and the complete insertion of the housing 90 in the housing 80 to its operative position, as shown in Fig. 4, will bring the pinion 112 into mesh with the pinion 88, as shown in Fig. 6.

Chain housing 90A is of the same construction as chain housing 90, and is secured in the member 80 in the same manner and by like means. However, its position therein is on the opposite side of the axial passage 60 from the chain housing 90, as shown in Fig. 4, so that its chain rotates parallel to and in the same direction as the chain 95 in chain housing 90. The chain in chain housing 90A is driven by the removable pinion 114 which is secured to the sprocket within the chain housing 90A in the same manner as the pinion 112 is secured to the sprocket 91 in the chain housing 90. The pinion 114 may be removed and replaced through the slot 111, shown in Fig. 2, in the manner described in connection with pinion 112 and chain housing 90, and it meshes and is driven by the pinion 87, as shown in Figs. 4 and 6.

The chain 95 in housing 90, and the similar chain in housing 90A are formed of a series of links which are shown in detail in Fig. 9. The face of each link has a semi-circular depression therein, as shown, adapted to fit upon the tube which passes through passage 60. The links are so formed and joined to each other, as shown in Fig. 4, that they present when passing through the passage 60, a substantially unbroken curved surface of considerable length which will grip substantially the entire circumference of a tube. The chains are so positioned in their housings that they extend outwardly into the passage 60 when the housings are in position, as shown in Fig. 4. The lateral extensions of the links ride upon and are supported by the edges of the plates 96 as they pass between sprocket and rollers. The necessary power to drive the chains is transmitted to the sprockets in the chain housings through the bevel gears 85 and 86 which engage the bevel gear 58, as shown in Figs. 1, 2 and 5. The bevel gears 85 and 86 carry with them in rotation the pinions 87 and 88, which in turn mesh with and drive the removable pinions 114 and 112 which are secured to the chain sprockets.

To the left of the gear 53 is a soldering chamber 120, as shown in Fig. 1, which has an opening in each end thereof aligned with the opening in nozzle 55 in the gear 53 through which a tube may pass, as shown in Figs. 1 and 11. The openings in each end of the solder chamber 120 are provided with removable bushings 118 and 119, as shown in Fig. 11, which will permit the use of bushings of different sizes to accommodate tubing of various sizes. Beneath the base 2 is suspended a solder pot 121, as shown in Fig. 1. Extending across the top of the soldering pot 121 and journaled in bearings 122 and 123 which are positioned on the frame 2 (Fig. 2) is a shaft 124 which is operated by a worm wheel 125 secured thereto which is beneath and engages the worm gear 15 on the hollow shaft 10, as shown in Figs. 2 and 10. Positioned upon the shaft 124 and revolving in the solder chamber 120, and also in the solder pot 121 is a disk 126, as shown in Figs. 10 and 11 having lateral blades 127 secured to one side thereof which are adapted upon rotation of the disk to carry solder from the pot 121 into the chamber 120 through which the tube passes.

Secured to the frame 2, as shown in Fig.

10, is a bracket 130 forwardly of the solder chamber 120, which supports an acid tank 131 over the line of passage of the tube. An arm 133 is pivotally secured to the upright portion of bracket 130 and has at its free end a head 134 with a grooved face adapted to fit over the tube. Lining the grooved face of the head 134 and adapted to wipe the tube in its passage, is a piece of felt or other suitable absorbent material 135. An aperture 136 is provided in the head 135 of arm 133 which leads from the top thereof to the grooved face of the lining 135. A pipe 137 leading from the acid tank 131 is aligned with aperture 136 in head 134 in order that acid may be passed therethrough and saturate the felt lining 135 and thus be applied to the tube before it passes into the solder chamber 120. An upwardly extending pin 138 is provided upon the head 134 of arm 133 and fits into a socket 139 secured upon the bottom of that part of the bracket 130 which supports the acid tank 131. Within the socket 139 is positioned a coil spring 140 against which the end of pin 138 bears and which is tensioned to force pin 138 downward and thus to hold the grooved face of head 134 and lining 135 firmly against the tube in its passage. Beneath the path of the tube and the head 134 is positioned a catch tank 141 which is secured to frame 2, as shown in Fig. 1, which catches all surplus acid from head 134.

Extended upwardly from the bracket 150 which carries bearing 38 as shown in Fig. 16, is a bracket 151 carrying at its upper end a ribbon guide roller 152 beneath which are positioned shaping rollers 153 and 154, as shown in Fig. 15. The roller 153 is formed with a slot 155 around the circumference thereof, as shown in Fig. 21, which is narrower than the metal ribbon which passes therethrough, and the width of the roller 154 is slightly less than the groove 155 in the roller 153 in order to form a right-angle flange on one edge of the ribbon. The roller 154 is mounted on a shaft 156, as shown in Figs. 15 and 17, which is carried by an extension 157 on the bracket 151. The shaft 156 is formed with an eccentric end which carries the roller 154, and surrounding the shaft 156 on the opposite side of the extension 157 from the roller 154 is a coil spring 158 which is secured thereon by washer 159 and nut 160. That part of the shaft 156 which carries the coil spring 158 is flattened, and between the coil spring 158 and the bearing 157 is positioned a handle 161 which is shaped to fit the flattened portion of the shaft 156. The spring 158 is tensioned to hold the end of the handle 161 tightly against the bearing 157. It is therefore possible by turning the shaft 156 by means of the handle 161 to move the roller 154 into or out of engagement with the roller 153, and the tension of the spring 158 causes sufficient friction between the handle 161 and extension 157 to hold the roller in any desired position.

Disposed beneath the rollers 153 and 154 and at right-angles to the plane thereof are a pair of rollers 170 and 171, as shown in Fig. 16. The roller 170 is secured to the bracket 151, and the roller 171 is secured to an extension 172 thereof, as shown in Fig. 17. The roller 170 has an acute angled groove around the circumference thereof, as shown in Fig. 19, and the roller 171 has a wedge shaped tongue 172 around the circumference thereof, as shown in Fig. 19 which rotates in the groove in roller 170, thus changing the right-angle flange in the metal ribbon formed by the rollers 153 and 154 to an acute angled flange. The roller 171 is mounted on the eccentric end of shaft 173 on the opposite side of the extension 172 from the roller 171, as shown in Fig. 17. That portion of the shaft 173 which is on the opposite side of extension 172 from roller 171 is flattened and a handle 177 is fitted over the flattened portion and against extension 172. A coil spring 174 is then disposed around the shaft 173, as shown, and is held thereon by washer 175 and nut 176. As this construction is the same as described for roller 154 it will be readily understood that the roller 171 may be adjusted as to its engagement with roller 170.

Formed in the lower part of bracket 151 and adjacent the bearing 38 is a bearing 180. In the bearing 180 is positioned a shaft carrying at one end a bevel gear 181, as shown in Fig. 2, which is positioned to engage bevel gear 39. The other end of the shaft carrying bevel gear 180 carries a crimping roll 182, as shown in Fig. 16, and in Fig. 1. Extending at right-angles from the bearing 180 is an extension 183, as shown in Figs. 15 and 16, in the end of which is journaled a shaft carrying second crimping roll 184, as shown in Fig. 1, which is positioned to engage crimping roll 182. The outer portions of the circumference of each of the crimping rolls 182 and 183 are corrugated and the inner portions of the circumferences are plain, so that one edge of the metal ribbon passing therethrough will be corrugated before it is wound upon the tube passing through the machine, and the acute angled flange which is formed on the ribbon by rolls 170 and 171 will be pressed flat against the other portion of the ribbon which is not corrugated, to form a double thickness at one edge thereof. The shaft carrying crimping roll 184 is mounted in the extension 183 in the same manner as the shafts carrying rolls 171 and 154 so that the roll 184 may be thrown into and out of engagement with roll 182. The crimping rolls 182 and 184 are so shaped and arranged that the corrugations on the respective rolls do not fully mesh when the rolls are in engagement so that the edge of the ribbon passing between the corrugations will be only slightly indented. The full corrugations are produced by winding the ribbon on the tube which provides a uniform corrugation that could not be obtained if they were fully formed by the crimping rolls.

Pivotally secured to the bracket 151 at 190, as shown in Fig. 16, is a lever arm 191, as shown in Figs. 2 and 16, which carries a double grooved roll 192 as shown in Fig. 2, which rides the tube as it passes. Beneath the crimping rolls 182 and 184, and to the bracket 151 is secured a ribbon guide shoe 195, as shown in Fig. 16 which curves transversely under the path of the tube and guides the ribbon passing between rolls 182 and 184, around the tube. As the ribbon leaves the guide shoe 195 it enters inner or right groove in roll 192 and its corrugated edge is thereby held in close con act with the tube which has been previously coated with solder. The outer or left groove in roll 192 rides the preceding spiral of the ribbon which has been wound on the tube, and serves to space the winding spiral guided by the inner groove.

Beneath the solder pot 121 is positioned a gas fixture 200, as shown in Fig. 1, which is used to heat the solder in the pot, and directly beneath the path of the tube after it passes the crimping rolls 182 and 184 is a second gas fixture 201 which serves to reheat the tube after the metal ribbon has been applied and thereby more firmly set the ribbon in the solder. This second gas fixture, while preferable, may be omitted if the tubing is being driven with sufficient speed to prevent any appreciable cooling of the solder between the end of the solder chamber and the fin applying device.

Leading from the acid tank 131 is a tube 205 which passes beneath the solder pot 121 and above the gas fixture 200, and then passes up and ends in a nozzle 206, as shown in Fig. 1 directly above the path of the tube as it leaves the soldering chamber 120, thus providing means for applying hot acid to the tube as it leaves the soldering chamber and before the metal ribbon is applied thereto. This, while preferable, may be omitted if desired and acid may be applied by any suitable means to the fin before it is applied to the tube.

The flow of acid from the tank 131 through pipe 137 to head 134, and through tube 205 to nozzle 206 is governed by the adjustable valves 207 and 208 respectively, as shown in Fig. 1.

Secured to the clutch shaft 21 which is operated by handle 22, as shown in Fig. 1, is a lever arm 210 to the free end of which is attached a rod 211 which leads to, and operates a shut-off cock in the gas fixture 201, thus providing means for shutting off the flow of gas in fixture 201 when the clutch 18 is thrown out of contact with gear 16, which is done when there is no tube passing through the machine.

Attached to the bracket 130 which supports the acid tank, as shown in Fig. 1, is an arm 220 upon the end of which is secured a ribbon guide roll 221 directly above the crimping rolls 182 and 184. The ribbon guide roll 221 is not used when the reinforcing rolls 153, 154, 170 and 171 are in use, as its place is taken by the guide roll 152, shown in Fig. 16. That part of the arm 151 carrying the rolls 152, 153 and 154, and 170 and 171 may be detached when it is not desired to form a reinforced ribbon. Extending upwardly at an angle from the bracket 130, and secured thereto is a second arm 222 upon the end of which is secured a ribbon supply roll 223.

In operation, the motor 6 driving the pinion 7, transmits power through the pinion 14, revolves the shaft 10 and the worm 15, which in turn drives the worm wheel 125 and the shaft 124 thereby revolving the solder wheel 126 in the solder pot 121 and forcing solder into the chamber 120. When the clutch 18 is thrown into operative contact with the pinion 16, power is transmitted to pinion 53, which in turn revolves the driving member 52 and the pinion 56 which transmits power to and operates pinion 63 which carries pinion 62. Pinion 62 in turn engages pinion 59 and turns sleeve 57 and bevel gear 58 which is engaged with bevel gears 85 and 86 on the driving member 52, and which in turn operate the chain driving mechanism in the member 52, thus forcing the tube through the passage 60 in the machine.

The gear 63 also drives the set gear 70 on the stub shaft 66 which carries with it the pinion 71, which in turn engages and drives pinion 33 and the solid shaft 30 which transmits power through the clutch mechanism 36 to the bevel gear 39 and bevel gear 181, and so to the crimping rolls 182 and 184. The gear 71 may be changed as desired to alter the rate of revolution of the shaft 30, and so alter the speed of the crimping rolls 182 and 184, and this changeability permits an adjustment when tubes of different sizes are passed through the machine. The tube is introduced into the machine through the passage 60 which extends through the center of the pinion 56 and passes through the sleeve 53 and is then gripped by the chain 95 and its mate in the chain housing 90A, and forced on through passage 60 and nozzle 55 beneath the acid applying member 134 where the tube is wiped clean and coated with acid, through the soldering chamber 120 where it is coated with solder, beneath the acid nozzle 206 where hot acid is applied to the solder on the tube, then past the crimping rolls 182 and 184, over the guide shoe 195, past the guide roll 192 where the metal ribbon is wound on it, and then over the gas fixture 201 where heat is applied to firmly set the metal ribbon on the soldered tube.

The position and construction of the chain 95 and its mate in the chain housing 90A provides a mechanism which is equally suitable for driving soft as well as hard tubing at a rate of speed which will permit the forming of six spiral fins per inch upon twelve or more feet of tubing per minute; and the gearing of the rotating and driving member 52 may be such as to cause the tube to be rotated 900 or more revolutions per minute. This applies to soft as well as hard tubing, whereas heretofore it has only been possible to wind the metal fin on hard tubing at anything approximating such a rate, while the rate at which soft tubing could be wound has been very considerably less.

The tube passage through the machine may be of a size that will carry tubing of diameters varying from five-sixteenths to one inch. The only adjustments that need to be made when changing from one size of tubing to another is to substitute chain drive units carrying chains which will fit the desired tubing,—substitute a smaller or larger gear for gear 71 in order to alter the speed of the crimping rolls to accommodate the desired tubing, and substitute bushings of the desired size in place of the bushings 119 and 118 in the solder chamber 120.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In a machine for continuously winding and securing a metal fin edgewise upon metal tubing, a tube feeding mechanism comprising a rotating member having an axial passage therethrough, a pair of chain driving units positioned in said rotating member on either side of said axial passage for driving a tube through said machine and for holding said tube for rotation with said rotating member, each of said chain driving units comprising a chain, chain support and driving means and each of said units being removable as a unit from said member without dismounting said member.

2. In a machine for continuously winding and securing a metal fin edgewise upon metal tubing, a rotatable member having an axial passage therethrough, a tube driving mechanism comprising a pair of housings disposed in said rotatable member at either side of said axial passage, a chain in each of said housings rotatably carried by a sprocket and a roller journaled therein, each of said chains being positioned to move lengthwise in the same direction through said axial passage for gripping and driving a tube therethrough and holding the same for rotation with said rotatable member, each of said housings with its sprocket, roller and chain being removable as a unit from said member without dismounting said member.

3. In a machine for spirally winding and securing a continuous metal fin edgewise upon metal tubing, means for securing said fin to said tubing comprising the combination of a chamber having a tube passage therethrough aligned in the path of the tubing through said machine, a solder container positioned beneath and secured to said chamber and open thereto, a rotatable member positioned within said chamber and solder container and adapted upon rotation to convey solder from said container to said chamber for application to tubing as it passes therethrough, means for applying a flux to said tubing prior to its passage through said chamber, means for applying hot flux to said soldered tubing after its passage through said chamber, and means for applying the fin to said soldered tubing after the application of hot flux thereto.

4. In a machine for spirally winding and securing a continuous metal fin edgewise upon metal tubing, means for securing said fin to said tubing comprising the combination of a chamber having a tube passage therethrough aligned in the path of the tubing through said machine, a solder container positioned beneath and secured to said chamber and open thereto, a rotatable member positioned within said chamber and solder container and adapted upon rotation to convey solder from said container to said chamber for application to tubing as it passes therethrough, means for applying a flux to said tubing prior to its passage through said chamber, means for applying hot flux to said soldered tubing after its passage through said chamber, means for applying the fin to said soldered tubing after the application of hot flux thereto, and means for heating said tube after the application of the fin thereto for securely setting said fin on said solder covered tube.

5. In a machine for spirally winding and securing a continuous metal fin edgewise upon metal tubing, means for preparing the tubing for application of the metal fin comprising a chamber having a tube passage therethrough aligned in the path of the tubing through said machine, a solder container positioned adjacent and open to said chamber and means for heating said solder container, a rotatable member positioned within said chamber and solder container and adapted upon rotation to convey solder from said container to said chamber for application to tubing as it passes therethrough, a flux applying device comprising a pivotal arm having its free end extended adjacent the path of the tubing and adapted to contact therewith at a point preceding the position of said solder chamber and having secured therein material for wiping and applying flux to said tubing as it passes, a flux container positioned adjacent said wiping arm and having a connection therewith for supplying flux to the wiping material in said arm, a tube leading from said flux container past the heating means for said solder container and within heatable proximity thereof to a point adjacent the path of tubing leaving the solder chamber for applying hot flux to the soldered tube prior to the positioning of the fin thereon.

6. In a machine for spirally winding and securing a continuous metal fin edgewise upon metal tubing, means for applying the fin to the tubing comprising a pair of rolls at least one of which is power driven and each having corrugations extending partly across their peripheral surfaces, positioned to partially engage each other at a point adjacent the path of tubing through the machine for incipiently forming corrugations in that edge of the metal fin which is to be secured to the tubing, a guide shoe having a curved slot therein positioned adjacent said crimping rollers and the path of said tubing for guiding said fin around said tubing, a guide roller having at least two circumferential grooves in the peripheral surface thereof positioned at a point adjacent the path of the tubing and adapted to press the metal fin edgewise against said tubing and to space the succeeding convolutions of said fin as it is applied to said tubing, and means for soldering the fin to the tube.

7. In a machine for spirally winding and securing a continuous metal fin edgewise upon metal tubing, means for forming a reinforced fin and preparing the same for application to said tubing comprising a pair of fin engaging rolls, one of said rolls having a circumferential groove in its peripheral surface of a width less than that of said fin and the other of said rolls having a circumferential flange on its peripheral surface of slightly less width than the circumferential groove in the first of said rolls, for forming a flange on the edge of said fin, a second pair of fin engaging rolls positioned adjacent said first rolls and adapted to receive said fin after it leaves said first rolls, one of said second pair of rolls having an acute angled circumferential groove in its peripheral surface, and the other of said second pair of rolls having circumferential flange on its peripheral surface shaped to fit the acute angled groove in said first roll for return bending the flange formed on said fin by said first pair of rolls, and a pair of crimping rolls positioned to receive said fin as it leaves said second pair of rolls, each of said crimping rolls having transverse corrugations extending partly across their peripheral surfaces and having the remaining portions of their peripheral surfaces plain, for corrugating the unflanged edge of said fin and for pressing the return bent portion of said fin firmly against the uncorrugated portion thereof.

8. A machine for spirally winding and securing a continuous metal fin edgewise upon metal tubing, comprising means for simultaneously rotating tubing and moving the same forward in a predetermined plane, means for applying flux to said tubing, means for coating said tubing with solder, means for applying hot flux to said solder covered tubing, and means for shaping a metal fin and applying the same edgewise upon and spirally around said solder coated tubing, said operations being performed in the order described.

9. A machine for spirally winding and securing a continuous metal fin edgewise upon metal tubing, comprising means for simultaneously rotating tubing and moving the same forward in a predetermined plane, means for applying flux to said tubing, means for coating said tubing with solder, means for applying hot flux to said solder covered tubing, and means for shaping a metal fin and applying the same edgewise upon and spirally around said solder coated tubing, and means for reheating the said assembly for firmly setting said fin upon said tubing, said operations being performed in the order described.

10. A machine for spirally winding and securing a continuous metal fin edgewise upon metal tubing, comprising means for simultaneously rotating tubing and moving the same forward in a predetermined plane, means for coating said tubing with flux, means for coating said tubing with solder, means for applying hot flux to said solder covered tubing, means for reinforcing the metal fin by folding one edge thereof upon itself, and means for shaping the metal fin and applying the same edgewise upon and spirally around said solder coated tubing, said operations being performed in the order described.

11. A machine for spirally winding and securing a continuous metal fin edgewise upon metal tubing, comprising means for simultaneously rotating tubing and moving the same forward in a predetermined plane, means for applying flux to said tubing, means for coating said tubing with solder, means for applying hot flux to said solder covered tubing, means for reinforcing the metal fin by folding one edge thereof upon itself, means for shaping the metal fin and applying the same edgewise upon and spirally around said solder coated tubing, and means for reheating the said assembly for firmly setting said fin upon said tubing, said operations being performed in the order described.

12. The process of spirally winding and securing a continuous metal fin edgewise upon metal tubing which consists in simultaneously rotating and longitudinally moving tubing in a predetermined direction and plane, and while said rotative and longitudinal movement continues successively applying flux and solder to said tubing, then successively applying heated flux thereto and shaping and spirally winding a metal fin edgewise thereon.

13. The process of spirally winding and securing a continuous metal fin edgewise upon metal tubing which consists in simultaneously rotating and longitudinally moving tubing in a predetermined direction and plane, and while said rotative and longitudinal movement continues successively applying flux and solder to said tubing, then successively applying heated flux thereto and shaping and spirally winding a metal fin edgewise thereon, and reheating said assembly for firmly setting said fin on said solder covered tubing.

14. The process of spirally winding and securing a continuous reinforced metal fin upon metal tubing which consists in simultaneously rotating and longitudinally moving tubing in a predetermined direction and plane, and while said rotative and longitudinal movement continues successively applying flux and solder to said tubing, then successively applying heated flux thereto, and folding one edge of a metal fin upon itself for reinforcement and corrugating the other edge thereof to permit a spiral winding, and spirally winding the said reinforced metal fin upon said tubing with the corrugated edge thereof bearing against said tubing.

15. The process of spirally winding and securing a continuous reinforced metal fin upon metal tubing which consists in simultaneously rotating and longitudinally moving tubing in a predetermined direction and plane, and while said rotative and longitudinal movement continues successively applying flux and solder to said tubing, then successively applying heated flux thereto, and folding one edge of a metal fin upon itself for reinforcement and corrugating the other edge thereof to permit a spiral winding, spirally winding the said reinforced metal fin upon said tubing with the corrugated edge thereof bearing against said tubing, and reheating said assembly for firmly setting said fin on said solder covered tubing.

16. In a machine for spirally winding and securing a continuous metal fin edgewise upon metal tubing, means for forming a reinforced fin and preparing the same for application to said tubing, comprising means for folding one edge of said fin upon itself, and means for corrugating the unfolded edge of said fin.

17. In a machine for spirally winding and securing a continuous metal fin edgewise upon indefinite lengths of metal tubing, the combination of means for simultaneously rotating and moving tubing forward in a predetermined plane, means for coating said tubing with solder and preparing the same to receive the fin, and means for applying the metal fin edgewise upon and spirally around said prepared tubing, said means being arranged and operating to engage said tubing successively in the order named.

18. In a machine for spirally winding and securing a continuous metal fin edgewise upon metal tubing, the combination of means for simultaneously rotating and moving tubing forward in a predetermined plane, means for coating said tubing with solder and preparing the same to receive the fin, and means for folding one edge of the fin upon itself and applying the same edgewise upon and spirally around said prepared tubing, said operations being performed in the order named.

19. In a machine for continuously winding and securing a continuous metal fin edgewise upon soft metal tubing, the combination of a rotatable member having an axial tube passage therethrough, a pair of endless chains carried thereby and positioned therein on opposite sides of and parallel to said passage, said chains being composed of links adapted and co-operating to nondeformably embrace and drivingly engage substantially the entire surface of tubing over a substantial length thereof, and means for revolving said chains in a plane parallel to said axial passage.

20. In a machine for continuously winding and securing a continuous metal fin edgewise upon soft metal tubing, the combination of a rotatable member having an axial tube passage therethrough, and means in and rotatable with said member adapted to nondeformably embrace and drivingly engage substantially the entire surface of tubing over a substantial length and to advance the same tubing longitudinally of said axial passage.

JOHN W. VANCE.